(12) United States Patent
Swartzentruber et al.

(10) Patent No.: US 9,571,376 B2
(45) Date of Patent: *Feb. 14, 2017

(54) TIMESTAMP PREDICTOR FOR PACKETS OVER A SYNCHRONOUS PROTOCOL

(71) Applicant: Microsemi Communications, Inc., Aliso Viejo, CA (US)

(72) Inventors: Ron Swartzentruber, Amesbury, MA (US); Ganesh Rao, Needham, MA (US)

(73) Assignee: Microsemi Communications, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,920

(22) Filed: May 26, 2015

(65) Prior Publication Data

US 2016/0020985 A1 Jan. 21, 2016

Related U.S. Application Data

(63) Continuation of application No. 12/895,467, filed on Sep. 30, 2010, now Pat. No. 9,042,366.

(51) Int. Cl.
*H04L 12/26* (2006.01)
*H04L 7/00* (2006.01)
*H04L 12/24* (2006.01)
*H04J 3/06* (2006.01)

(52) U.S. Cl.
CPC .......... *H04L 43/106* (2013.01); *H04J 3/0685* (2013.01); *H04J 3/0697* (2013.01); *H04L 7/0091* (2013.01); *H04L 41/147* (2013.01); *H04L 43/0852* (2013.01); *H04J 3/0682* (2013.01); *H04J 3/0691* (2013.01); *H04J 2203/0082* (2013.01)

(58) Field of Classification Search
CPC ............... H04L 12/66; H04L 29/0621; H04L 29/06163; H04L 29/06224; H04L 29/06068; H04L 43/106; H04L 43/0852; H04L 7/0091; H04L 41/147; H04J 3/06
See application file for complete search history.

(56) References Cited

U.S. PATENT DOCUMENTS

| | | |
|---|---|---|
| 7,069,458 B1 | 6/2006 | Sardi et al. |
| 7,689,854 B2 | 3/2010 | Ilnicki et al. |
| 7,778,283 B2 | 8/2010 | Eidson |
| 2002/0027886 A1 | 3/2002 | Fischer et al. |
| 2005/0058149 A1 | 3/2005 | Howe |

(Continued)

OTHER PUBLICATIONS

Eidson et al., (2008). International IEEE Symposium on Precision Clock Synchronization for Measurement, Control and Communication. ISPCS 2008. Spider Transparent Clock. Sep. 22-26, 2008. Ann Arbor, Michigan.

(Continued)

*Primary Examiner* — Un C Cho
*Assistant Examiner* — Jeremy Costin
(74) *Attorney, Agent, or Firm* — Simon Kahn

(57) ABSTRACT

A physical layer communication device (PHY) transmits and receives signal to and from a communication link using a synchronous protocol. The PHY communicates with a higher-layer device using a packet protocol. Timestamp values contained in timing-related messages in some packets are written or modified by the PHY. Delays incurred in transmitting and receiving the packets are predicted and used in setting the timestamp values.

8 Claims, 5 Drawing Sheets

(56) References Cited

U.S. PATENT DOCUMENTS

| | | |
|---|---|---|
| 2005/0135429 A1 | 6/2005 | Bingham et al. |
| 2005/0273639 A1* | 12/2005 | Pessolano ............. G06F 9/3869 713/400 |
| 2006/0203851 A1 | 9/2006 | Eidson |
| 2006/0256820 A1 | 11/2006 | Ilnicki et al. |
| 2007/0201877 A1 | 8/2007 | Epps et al. |
| 2007/0268938 A1 | 11/2007 | Dowd |
| 2008/0126548 A1 | 5/2008 | Moore et al. |

OTHER PUBLICATIONS

Garner et al., (2010). International IEEE Symposium on Precision Clock Synchronization for Measurement, Control and communication. ISPCS 2010. Using an IEEE 802.1AS Network as a Distributed IEEE 1588 Boundary, Ordinary, or Transparent Clock. Sep. 27, 2010-Oct. 1, 2010. Portsmouth, New Hampshire.

Prof. Hans Weibel, Zurich University of Applied Sciences: Tutorial at the 2006 Conference on IEEE 1588; Oct. 2006.

U.S. Appl. No. 12/895,467, filed Sep. 30, 2010, Ron Swartzentruber; Ganesh Rao, US 2012/0082156 A1, Office Actions dated Aug. 9, 2012; Apr. 9, 2014; Final Office Actions dated Feb. 6, 2013; Oct. 21, 2014; Notice of Allowance dated Jan. 26, 2015.

Extended European Search Report for parallel case EP 11183242.4 dated Mar. 22, 2016, issued by European Patent Office.

Qiuyou Wu, Huawei Technologies Co et al; "Mapping Method to Support Timing over OTN"; ITU Study Group 15—Contribution 949; International Telecommunication Union, Geneva, Switzerland, May 2010.

Gorshe, Steve, Winston Mok, Richard Tse; PMC-Sierra ; "Proposed Frequency and Time-of-Day Method for OTN"; ITU Study Group 15—Contribution 749; International Telecommunication Union, Geneva, Switzerland, Apr. 2010.

Bin Lue, Yong Tu; Fei Su, ZTE Corporation ; "Consideration on Phase/Time Synchronization Over OTN"; ITU Study Group 15—WD22; International Telecommunication Union, Geneva, Switzerland, Sep. 2010.

Jobert, Sebastien, France Telecom; "PG.8251: OTN Timing Aspects"; ITU Study Group 15—Contribution 1019; International Telecommunication Union, Geneva, Switzerland, May 2010.

\* cited by examiner

TIMESTAMP PREDICTOR FOR PACKETS OVER A SYNCHRONOUS PROTOCOL

CROSS-REFERENCE TO RELATED APPLICATION

The present application is a continuation of U.S. patent application Ser. No. 12/895,467, filed Sep. 30, 2010, the disclosure of which is incorporated by reference herein.

BACKGROUND OF THE INVENTION

The present invention relates generally to synchronization of clocks and, more particularly, to synchronization of clocks in a communication network including packets communicated using a synchronous protocol.

It may be advantageous for devices in a networked system to have a common time base. The common time base may be used, for example, to trigger coordinated measurement instances in a network of sensors or to coordinate actions of controllers in an industrial system. In addition to sensors and controllers, the system may include computers and communication devices, such as routers.

The electronics industry has developed several standard protocols for use in synchronizing clocks, for example, the Precision Time Protocol (PTP) of IEEE 1588. PTP includes sending timing-related messages between nodes in a communication network. The timing-related messages include, for example, a node transmitting a time-stamped packet to supply its time base to another node and a node transmitting a packet requesting the receiving node to reply with the time of receipt. A device that forwards timing-related messages from one node to another node may adjust a timestamp in the messages based on the device's delay in forwarding the message. Any errors or inaccuracies in handling the timing-related messages may be detrimental to accurate clock synchronization and the detriment may be cumulative over multiple network devices.

BRIEF SUMMARY OF THE INVENTION

Aspects of the invention provide for adjusting packet timestamps based on predictions of packet pipeline delays.

In some aspects the invention provides a physical layer communication device, including: a transmit timestamp processor configured to receive packets formatted according to a packet protocol and configured to update timestamp fields contained in timing-related messages contained in at least some of the received packets utilizing at least predicted transmission delays; a transmit processing block coupled to the transmit timestamp processor, the transmit processing block configured to adapt the packets to a synchronous protocol and to transmit a signal formatted according to the synchronous protocol containing the packets; a transmit delay predictor configured to predict transmission delays that will be incurred in the transmitting the packets in the signal from the transmit processing block and supply the predicted transmission delays to the transmit timestamp processor; a receive processing block configured to receive a signal formatted according to the synchronous protocol and extract packets formatted according to the packet protocol from the received signal; a receive timestamp processor coupled to the receive processing block, the receive timestamp processor configured to update timestamp fields contained in timing-related messages contained in at least some of the packets from the receive processing block utilizing at least predicted reception delays; and a receive delay predictor configured to predict delays incurred in the receive processing block and supply the predicted reception delays to the receive timestamp processor.

In some aspects the invention provides a transmission device, including: circuitry configured to update timestamp fields contained in timing-related messages contained in at least some packets received by the circuitry utilizing at least predicted transmission delays; circuitry configured to adapt the packets from a packet protocol to a synchronous protocol, the circuitry coupled to the circuitry configured to update timestamp fields and further configured to transmit a signal formatted according to the synchronous protocol containing the packets; and circuitry configured to predict delays that will be incurred in the circuitry configured to adapt the packets from the packet protocol to the synchronous protocol and supply the predicted transmission delays to the circuitry configured to update timestamp fields.

In some aspects the invention provides a receive device, including: circuitry configured to extract packets formatted according to a packet protocol from a signal received formatted according to a synchronous protocol; circuitry configured to update timestamp fields contained in timing-related messages contained in at least some of the packets, the circuitry coupled to the circuitry configured to extract packets utilizing at least predicted reception delays; and circuitry configured to predict delays incurred in the circuitry configured to extract packets and supply the predicted reception delay to the circuitry configured to update timestamp fields.

In some aspects the invention provides a method of processing a timing-related message, the method including: receiving a packet containing the timing-related message, the packet formatted according to a packet protocol; predicting a delay to be incurred in transmitting the packet; updating a timestamp field in the timing-related message in the packet based on the predicted delay; adapting the packet containing the updated timestamp field for transmission using a synchronous protocol; and transmitting the adapted packet using the synchronous protocol.

In some aspects the invention provides a device for processing a timing-related message, the device including: a packet writer configured to receive packets, at least some of the packets containing timing-related messages, the packet writer configured to update timestamp fields in the timing-related messages based on predicted transmission times; a packet processing block coupled to the packet writer for receiving the packets, the packet processing block configured to process the packets according a packet protocol; a packet-to-synchronous adapter coupled to the packet processing block for receiving the packets, the packet-to-synchronous adapter configured to map the packets to a synchronous protocol; a synchronous processing block coupled to the packet-to-synchronous adapter for receiving the packets mapped to the synchronous protocol, the synchronous processing block configured to process and transmit the packets according the synchronous protocol; a time calculator configured to calculate the predicted transmission times indicating when the packets will be transmitted; and a transmit delay predictor coupled to the packet processing block, the packet-to-synchronous adapter, and the synchronous processing block, the transmit delay predictor configured to predict delays in transmitted packets using information from the packet processing block, the packet-to-synchronous adapter, and the synchronous processing block and supply the predicted delays to the time calculator for use in calculating the predicted transmission times.

In some aspects the invention provides a method of processing a timing-related message, the method including: receiving a signal formatted according to a synchronous protocol, the signal containing packets formatted according to a packet protocol; extracting a packet containing the timing-related message from the received signal; predicting a delay incurred in receiving the packet; and updating a timestamp field in the timing-related message based on the predicted reception delay.

In some aspects the invention provides a method of processing a device for processing a timing-related message, the device including: a synchronous processing block configured to receive data from an input signal formatted according to a synchronous protocol and configured to process the received data according the synchronous protocol; a synchronous-to-packet adapter coupled to the synchronous processing block for receiving the processed data, the synchronous-to-packet adapter configured to extract packets formatted according to a packet protocol from the data, at least some of the packets containing timing-related messages; a packet processing block coupled to the synchronous-to-packet adapter for receiving the extracted packets, the packet processing block configured to process the packets according the packet protocol; a packet writer coupled to the packet processing block for receiving the packets, the packet writer configured to update timestamp fields in the timing-related messages based on predicted reception times; a time calculator configured to calculate the predicted receptions times indicating when the packets were received; and a receive delay predictor coupled to the synchronous processing block, the synchronous-to-packet adapter, and the packet processing block, the transmit delay predictor configured to predict delays in receiving packets using information from the synchronous processing block, the synchronous-to-packet adapter, and the packet processing block and supply the predicted delays to the time calculator for use in calculating the predicted reception times.

These and other aspects of the invention are more fully comprehended on review of this disclosure.

DETAILED DESCRIPTION

Figure 1:
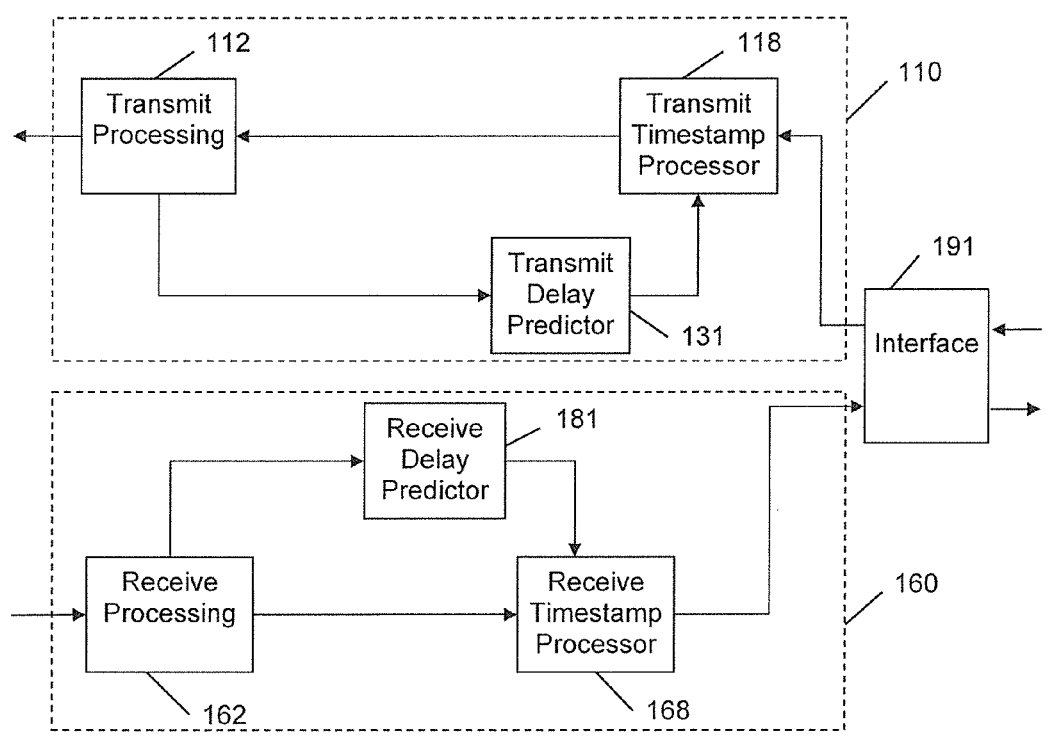
FIG. 1 is a block diagram of a physical layer communication device in accordance with aspects of the invention.

FIG. 1 is a block diagram of a physical layer communication device (PHY) in accordance with aspects of the invention. The PHY includes a receive path block 160 to receive an input signal from a communication network and a transmit path block 110 to transmit an output signal to the communication network. The PHY also includes an interface block 191 for coupling to higher-level devices. In some embodiments, various other processing or formatting blocks may also be included in the signal path between the receive path block 160 and the interface block 191 and the transmit path block 110 and the interface block 191. The blocks of the PHY are generally implemented with electronic circuitry. For example, in one embodiment the PHY is provided in a CMOS integrated circuit. Software programming may be used to control operation of some circuitry in the PHY. In one embodiment, a programmable processor is used to configure the circuitry of the PHY and to handle exception conditions.

The PHY communicates through the interface block 191 with data formatted according to a packet protocol. According to the packet protocol, for example, Ethernet, data may be communicated between the PHY and the interface block asynchronously or at irregular intervals. In contrast, the PHY may be configured to send and receive data to and from the communication network formatted according to a synchronous protocol, which sends data in frames that occur at regular intervals. The synchronous protocol may be a truly synchronous protocol, for example, synchronous optical networking (SONET), or a plesiochronous protocol, for example, optical transport network (OTN). The PHY maps packets into frames for transmission in the communication network and extracts packets from frames received from the communication network.

The PHY also provides processing of timing-related messages contained in some packets. For packets transmitted to the communication network with a timing-related message, the PHY predicts the time that the packet will be transmitted. For packets received from the communication network with a timing-related message, the PHY predicts the time that the packet was received. Some packets may have the predicted times of transmission or receipt written into the packet. Other packets may have their contents modified based on the predicted times of transmission or receipt. For still other packets, the PHY may supply the times of transmission or receipt to a higher-level device for further use. The predicted times include delays that occur in transmitting or receiving the packets.

The interface block 191 provides an interface that may be coupled to a higher-level component, such as a media access controller (MAC). The interface may also be coupled to another PHY. The interface may be a standardized interface, for example, a ten-gigabit media-independent interface (XGMII). The interface block 191 receives packets from the receive path block 160. The interface block 191 transmits the received packets over the interface. The interface is bidirectional and the interface block 191 receives packets for transmission over the interface. Packets received over the interface are supplied to the transmit path block 110. In other embodiments, there are separate interface blocks for receive and transmit.

The transmit path block 110 includes a transmit timestamp processor 118 that receives data packets. As shown in the embodiment of FIG. 1, the transmit timestamp processor 118 may receive the data packets from the interface block 191. In other embodiments, the transmit timestamp processor 118 may receive the data packets from another processing block, for example, a block that classifies the data packets according to higher-level protocols that will receive the same or similar processing, or other blocks involved in the preparation of the data packets for transmission. Some of the data packets include timing-related messages that are modified or determined by the transmit timestamp processor 118. The transmit timestamp processor 118 modifies the contents of the data packets based on the time that the data packet will be transmitted from the PHY. The data packets from the transmit timestamp processor 118 are supplied, in some embodiments through an additional processing block, to a transmit processing block 112. The transmit processing block 112 processes the data packets for transmission in the communication network. The transmit processing block 112 includes circuitry configured to map the data packets from the packet protocol to the synchronous protocol.

The transmit processing block 112 may introduce delays, including variable delays, to packet transmission. For example, a packet may incur a delay in the transmit processing block 112 that depends on the timing of the arrival of the packet relative to frame boundaries in the transmit processing block 112. Accordingly, the transmit path block 110 includes a transmit delay predictor 131 to monitor the transmit processing block 112 and supply predicted transmission times or delays to the transmit timestamp processor 118. Functions of the transmit delay predictor 131 may also be included in the transmit timestamp processor 118 and the transmit processing block 112.

The transmit delay predictor 131 receives delay-related information from the transmit processing block 112. The delay-related information may include delays in the transmit processing block 112 that are fixed, for example, a one clock cycle delay for a scrambling operation. Other delays in the transmit processing block 112 may depend on a state of the transmit processing block 112. For example, the delay of a framing operation may vary with the state of the framing, in particular, whether the framing operation is operating on an overhead section of a frame. Still other delays in the transmit processing block 112 may depend on characteristics of the packet supplied to the transmit processing block 112. For example, when the packet is supplied to the transmit processing block 112 using a parallel bus, the delay may depend on the position of data from the packet on the parallel bus. The transmit delay predictor 131 may combine the delay-related information with a time value from a local clock to supply a predicted transmission time to the transmit timestamp processor 118. In another embodiment, the transmit delay predictor 131 may supply just the predicted delay to the transmit timestamp processor 118. In one embodiment, the transmit delay predictor 131 supplies the predicted delay indirectly. For example, the transmit delay predictor 131 may supply delay dependencies, such as the relationship between a packet's position on a parallel bus and the delay, to the transmit timestamp processor 118.

The receive path block 160 includes a receive processing block 162 that receives an input signal that may be formatted according to the synchronous protocol from a communication link in the communication network. The receive processing block 162 processes the input signal to recover data from the input signal and produce data packets. The data packets are formatted according to the packet protocol. The data packets from the receive processing block 162 are supplied to a receive timestamp processor 168. The receive timestamp processor 168 may receive the data packets by way of another processing block, for example, a block that classifies the data packets. Some of the data packets include timing-related messages that are modified by the receive timestamp processor 168. As shown in the embodiment of FIG. 1, the data packets from the receive timestamp processor 168 may be supplied to the interface block 191. In other embodiments, receive timestamp processor 168 may supply the data packets to another processing block. The receive timestamp processor 168 modifies the contents of the data packets that include timing-related messages based on the time that the data packet is received by the PHY. Since receipt of the data packet at the receive timestamp processor 168 is delayed from receipt of the data packet by the PHY, accuracy of the timing may be improved by accurately predicting the delay. Accordingly, the receive path block 160 includes a receive delay predictor 181 to supply predicted reception times to the receive timestamp processor 168.

The receive delay predictor 181 receives delay-related information from the receive processing block 162. The delay-related information may include delays in the receive processing block 162 that are fixed, for example, a one clock cycle delay for a descrambling operation. Other delays in the receive processing block 162 may depend on a state of the receive processing block 162. For example, the delay of a gearbox, for example, as specified for the physical coding sublayer of the 10GBASE-R variant of Ethernet, may vary with the state of the gearbox, in particular, the alignment of the inputs and outputs. Still other delays in the receive processing block 162 may depend on characteristics of the packet supplied from the receive processing block 162. For example, when the packet is supplied from the receive processing block 162 using a parallel bus, the delay may depend on the position of data of the packet on the parallel bus. Additionally, the delay may depend on the position of the packet relative to overhead sections of frames in the input signal. The receive delay predictor 181 may combine the delay-related information with a local clock to supply a predicted reception time to the receive timestamp processor 168. Another embodiment may supply just the predicted delay to the receive timestamp processor 168. In one embodiment, the receive delay predictor 181 supplies the predicted delay indirectly. For example, the receive delay predictor 181 may supply delay dependencies to the receive timestamp processor 168.

Figure 2:
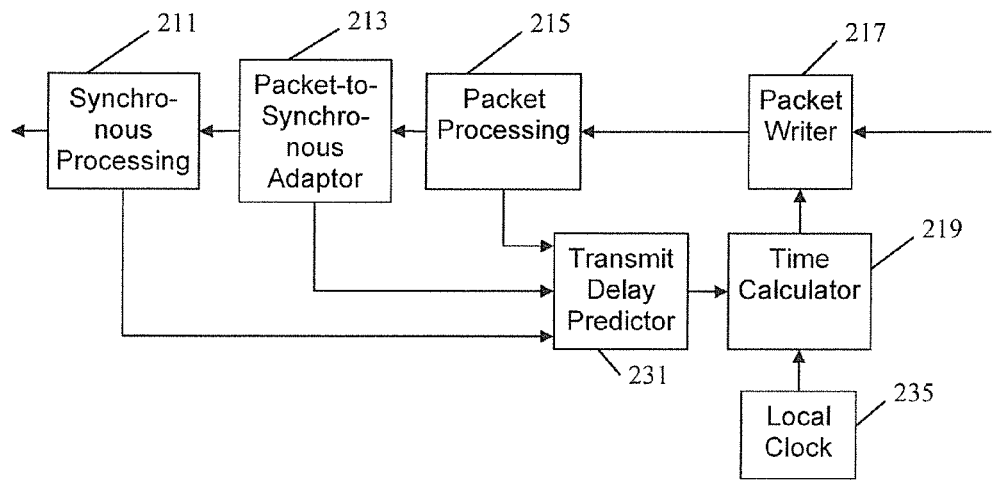
FIG. 2 is a block diagram of a transmit path device in accordance with aspects of the invention.

FIG. 2 is a block diagram of a transmit path device in accordance with aspects of the invention. The transmit path device of FIG. 2 may be used in some embodiments as the transmit path block of the PHY of FIG. 1.

Packets are received by a packet writer 217. The packets may be received from a link layer device such as a media access controller. The received packets may contain a timing-related message, for example, a message according to the Precision Time Protocol (PTP) of IEEE Standard 1588. Depending on the particular message, the packet may include a field to be filled with or modified based on the time at which the packet is transmitted. The packet writer 217, for packets with timing-related messages where a field is to be filled with the time of transmission, writes the transmission time from a time calculator 219 into the packet. For other timing-related messages, the packet writer 217 may modify a timestamp value in the packet, for example, by adding the transmission time to the timestamp value and writing the sum into the packet. The packet writer 217 may also set or update other fields in the packet, for example, a cyclic redundancy check field, based on the value written in the timing-related message. The modified packet is supplied to a packet processing block 215. For packets without timing-related messages or with timing-related messages that are not processed by the packet writer 217, the packet writer 217 passes the packets to the packet processing block 215 without modification.

The time calculator 219 combines delay predictions from a transmit delay predictor 231 and time values from a local clock 235 to calculate the transmission times for the packet. The time of transmission is defined, for example, in PTP, as the time when a start of frame delimiter for the packet enters the physical medium in which the packet is transmitted. The transmission time is supplied from the time calculator 219 to the packet writer 217.

The local clock 235 supplies a local time base for the transmit path device. The local clock 235 generally provides time values that are synchronized to another clock in the communication network. In some embodiments, the time values from the local clock 235 are supplied to the transmit delay predictor 231 where they are combined with the predicted transmission delays to directly provide predicted transmission times to the time calculator 219.

The packet processing block 215 prepares the packet for transmission by processing the packet according to a packet protocol. For example, the packet processing block 215 may process the packet according to the physical coding sublayer (PCS) specification for 10GBASE-R Ethernet. In one embodiment for a 10GBASE-R PCS, the packet processing block 215 includes a 64B/66B encoder, a scrambler, and a gearbox. The 64B/66B encoder codes groups of 64 bits of data from the packet to groups of 66 bits. The encoded data is scrambled by the scrambler and supplied to the gearbox. The gearbox maps sequential 66-bit groups of data to sequential 64-bit groups of data.

The packet processing block 215 introduces a delay as a packet passes from its input to its output. An indication of the amount of delay introduced is provided to the transmit delay predictor 231. Some of the delay may be fixed. For example, the delays for the 64B/66B encoder and the scrambler may be a fixed number of clock cycles. Some of the delay may vary. For example, the delay for the gearbox may be a variable number of clock cycles. Variation in the delay may depend on characteristics of the received packet. For example, in an embodiment where data from the packet is received on a 64-bit wide bus, the delay in passing a start of frame delimiter may vary with the location of the start of frame delimiter within the 64-bit wide bus. Variation in delay may also depend on a state of the packet processing block 215. For example, the delay introduced by the gearbox varies depending on the alignment of a data value in the 66-bit inputs relative to the 64-bit outputs.

The packet processing block 215 provides, in some embodiments, an indication of the total delay directly to the transmit delay predictor 231. Other embodiments may provide the transmit delay predictor 231 with an indication of only the variable portion of the delay with the fixed portion having a pre-established value known by the transmit delay predictor 231. In other embodiments, the transmit delay predictor 231 may determine the delay introduced by the packet processing block 215 based on information it receives about the state of the packet processing block 215 and information about the packet.

Packets from the packet processing block 215 are supplied to a packet-to-synchronous adapter 213. The packets are adapted for transmission using a synchronous protocol. The adaptation may follow a standard, for example, the WAN interface sublayer (WIS) specified by IEEE 802.3 or the generic framing procedure (GFP) specified by ITU-T G.7041. In one embodiment, the packet-to-synchronous adapter 213 includes a rate buffer and a framing block. The rate buffer provides buffering between differing data rates of the packet and synchronous protocols. The data rates may differ on a long-term basis, for example, when clock signals are used for processing the packet and synchronous protocols that are offset in frequency. The data rates may also differ on a short-term basis, for example, when frame or packet boundaries are processed. The packets are generally separated by inter-packet gaps and in some embodiments the packet-to-synchronous adapter 213 may increase or decrease, or remove, the length of an inter-packet gap, although in some embodiments inter-packet gap removal or alteration may be performed by other blocks. The framing block provides overhead signals for the synchronous protocol and inserts the packets into frames of the synchronous protocol.

The packet-to-synchronous adapter 213 introduces a delay as a packet passes from its input to its output. An indication of the amount of delay introduced is provided to the transmit delay predictor 231. Some of the delay may be fixed and some of the delay may vary. For example, the delay for the rate buffer may vary in proportion to the number of entries in a FIFO used for buffering. The number of entries in the FIFO may change, for example, during a frame, due to small rate mismatches between a read clock and a write clock of the FIFO. Accordingly, a time-averaged number of entries may be determined and used to predict the variable delay caused by the rate buffer. Delay through the packet-to-synchronous adapter 213 may vary when inter-packet gaps are modified, although in many embodiments inter-packet gaps may be modified prior to packets being processed by the packet writer 217, with therefore no need for the transmit delay predictor to account for such delays. The framing block may also cause a delay that varies with the progression of a frame. When a packet arrives at a time within a frame that is dedicated to the overhead signals, the packet will be delayed until the overhead signals are finished. Thus, the delay for a packet through the framing block may vary through a range of values corresponding to the time used for transmitting the overhead signals. In an embodiment of the packet-to-synchronous adapter 213 providing processing according to the WAN interface sublayer (WIS) specified by IEEE 802.3, the delay may be considered a WIS overhead time. Additionally, circuitry in the packet processing block 215 may operate using a gapped clock signal, for example as may be used in some implementations with respect to OTN framing, which has some clock pulses suppressed. The delay in processing a packet increases correspondingly when gaps occur in the clock signal.

The packet-to-synchronous adapter 213, in some embodiments, provides an indication of the total delay directly to the transmit delay predictor 231. In other embodiments, the packet-to-synchronous adapter 213 may provide the transmit delay predictor 231 with an indication of only the variable portion of the delay with the fixed portion having a pre-established value known by the transmit delay predictor 231. In other embodiments, the transmit delay predictor 231 may determine the delay introduced by the packet-to-synchronous adapter 213 based on information about the state of the packet-to-synchronous adapter 213 and information about the packet.

The packet-to-synchronous adapter 213 supplies frames containing packets to a synchronous processing block 211. The frames are further processed for transmission according to the synchronous protocol that the packets were adapted to in the packet-to-synchronous adapter 213. In one embodiment, the synchronous processing block 211 includes a serializer. The serializer converts data supplied as parallel words to a serial stream of data.

The synchronous processing block 211 introduces a delay as a packet in a frame passes from its input to its output. An indication of the amount of delay introduced is provided to the transmit delay predictor 231. Some of the delay may be fixed and some of the delay may vary. For example, the delay for the serializer varies with the location of the start of the packet within a parallel word, with for example data later in the packet being output from the serializer only after serialization of data earlier in the packet, although in some embodiments a variable delay indicative of sub-word location of the start of packet for serializing embodiments that process parallel words on a sub-word basis may be sufficient. In some embodiments, an indication of the total delay is provided directly to the transmit delay predictor 231. Other embodiments may provide the transmit delay predictor 231 with an indication of only the variable portion of the delay. In other embodiments, the transmit delay predictor 231 may determine the delay introduced by the synchronous processing block 211 based on information about the synchronous processing block 211 and information about the packet.

The transmit delay predictor 231 combines the delay information received from the packet processing block 215, the packet-to-synchronous adapter 213, and the synchronous processing block 211 to supply a predicted delay to the time calculator 219. The transmit delay predictor 231 includes interaction between the processing blocks in determining the predicted delay. For example, a delay variation in the packet processing block 215 caused by a gearbox may change a delay in the packet-to-synchronous adapter 213 due to delay variation in a framing block. The transmit delay predictor 231 may use a counter that indicates predicted timing of overhead signals in the synchronous protocol. Predicted timing of the overhead signals, along with predicted timing of delays in the arrival of the start of packet at the framer where the overhead signals are inserted, allows the transmit delay predictor 231 to predict whether the start of a packet will be delayed due to transmission of the overhead signals and account for such delays. In addition, when circuitry in the transmit path block operates using a gapped clock signal, the transmit delay predictor 231 includes an adjustment in the predicted delays to account for gaps in the clock signal. In some embodiments, gaps in the gapped clock signal occur cyclically. The transmit delay predictor 231 may keep a history of when clock gaps have occurred to predict the delay that a current packet will encounter. Some delays may be predicted as a number of clock cycles. Delays expressed in units of clock cycles are converted to time values, for example, by table look-up, and added to other predicted delays in units of time.

In many embodiments, the blocks within the transmit path block operate on a packet without storing the packet in a memory. For example, concurrent with the packet processing block 215 processing a portion of a packet, the synchronous processing block 211 may be processing an earlier portion of the packet.

Figure 3:
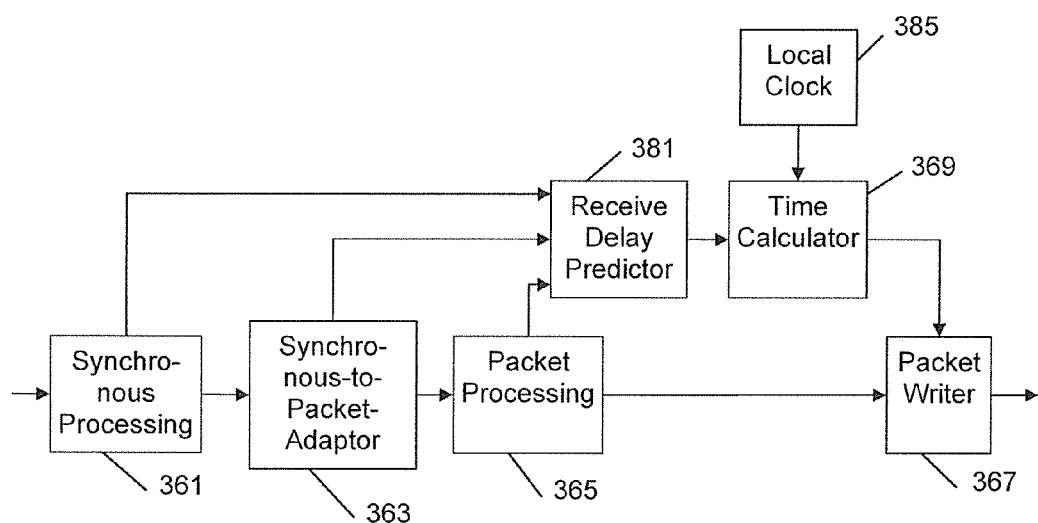
FIG. 3 is a block diagram of a receive path device in accordance with aspects of the invention.

FIG. 3 is a block diagram of a receive path device in accordance with aspects of the invention. The receive path device may be used in some embodiments as the receive path block of the PHY of FIG. 1. An input signal formatted according to a synchronous protocol is received by a synchronous processing block 361. After processing in the synchronous processing block 361, a packet-to-synchronous adapter 363 extracts packets from the input signal. A packet processing block 365 processes the packets according to a packet protocol and supplies the processed packets to a packet writer 367. The packet writer 367 modifies the packets using reception times from a timing calculator 369. The modified packets may be supplied, for example, to a link layer device. The timing calculator 369, from a receive delay predictor 381, receives predictions of the delays through the synchronous processing block 361, the packet-to-synchronous adapter 363, and the packet processing block 365. The time calculator 369 also receives time values from a local clock 385. The time calculator 369 combines the predicted delays and the time values to produce the reception times.

The synchronous processing block 361 process the input signal according to the synchronous protocol. In many embodiments, an input signal is received from the communication link according to a standard format, for example, the 10GBASE-W standard for Ethernet or the ITU-T G.709 standard for OTN. In one embodiment, the synchronous processing block 361 includes amplifiers, signal equalizers, phase locked loops, and a deserializer. The deserializer converts the input signal received as a serial stream of data to parallel words of data.

The synchronous processing block 361 introduces a delay as a packet in a frame passes from its input to its output. An indication of the amount of delay introduced is provided to the receive delay predictor 381. Some of the delay may be fixed and some of the delay may vary. For example, the delay for the deserializer may vary with the location of the start of the packet within a parallel word with each data value in a parallel word having a different delay according to the order in which the data values are serialized, although in some embodiments predicting delays on a sub-word basis is sufficient. In some embodiments, the synchronous processing block 361 directly provides an indication of the total delay to the receive delay predictor 381. Other embodiments may provide the receive delay predictor 381 with an indication of only the variable portion of the delay. In other embodiments, the receive delay predictor 381 may determine the delay introduced by the synchronous processing block 361 based on information about the synchronous processing block 361 and information about the packet.

The synchronous-to-packet adapter 363 extracts packets from the synchronous protocol input. Adaptation from the synchronous protocol to the packet protocol may follow a standard, for example, the WAN interface sublayer (WIS) specified by IEEE 802.3 or the generic framing procedure (GFP) specified by ITU-T G.7041. In one embodiment, the synchronous-to-packet adapter 363 includes a rate buffer and a deframing block. The rate buffer provides buffering between differing data rates of the synchronous and packet protocols. The data rates may differ, for example, due to different defined data rates of the synchronous and packet protocols or small differences in the rates of clock signals used for the synchronous and packet protocols. The deframing block removes overhead signals found in the synchronous protocol and identifies and extracts packets formatted according to the packet protocol.

The synchronous-to-packet adapter 363 introduces a delay as data passes from its input to its output. An indication of the amount of delay introduced is provided to the receive delay predictor 381. Some of the delay may be fixed and some of the delay may vary. For example, the delay for the rate buffer may vary in proportion to the number of entries in a FIFO used for buffering. The number of entries in the FIFO may change, for example, based on long-term and short-term differences in data rates between the synchronous and packet protocols. Accordingly, a time average may be used to predict the variable delay caused by the rate buffer. The deframing block may also cause a delay that varies with the location of the packet relative to the location of the frame overhead signals. Additional delay variation may occur in some embodiments when inter-packet gaps are removed or modified in length for rate matching, which may occur in the synchronous-to-packet adapter 363 or other blocks.

The synchronous-to-packet adapter 363 provides, in some embodiments, an indication of the total delay directly to the receive delay predictor 381. Other embodiments may provide the receive delay predictor 381 with an indication of only the variable portion of the delay with the fixed portion having a pre-established value known by the receive delay predictor 381. In other embodiments, the receive delay predictor 381 may determine the delay introduced by the synchronous-to-packet adapter 363 based on information about the state of the synchronous-to-packet adapter 363 and information about the packet.

The packet processing block 365 performs processing on the packets according to the packet protocol. For example, the packet processing block 365 may process the packets according to the PCS specification for 10GBASE-R Ethernet. In one embodiment, the packet processing block 365 includes a gearbox, a descrambler, and a 66B/64B decoder. The gearbox maps sequential 64-bit groups of data to sequential 66-bit groups of data. The 66-bit groups of data are descrambled by the descrambler and supplied to the 66B/64B decoder. The 66B/64B decoder decodes groups of 66 bits of data to groups of 64 bits.

The packet processing block 365 introduces a delay as a packet passes from its input to its output. An indication of the amount of delay introduced is provided to the receive delay predictor 381. Some of the delay may be fixed. For example, the delays for the 66B/64B decoder and the descrambler may be a fixed number of clock cycles. Some of the delay may be variable. For example, the delay for the gearbox may be a variable number of clock cycles. Variation in the delay may depend on the characteristics of the extracted packet. For example, in an embodiment where data from the packet is supplied on a 64-bit wide bus, the delay in passing a start of frame delimiter may vary with the location of the start of frame delimiter within the 64-bit wide bus. Variation in delay may also depend on a state of the packet processing block 365. For example, the delay introduced by the gearbox varies depending on the alignment of data between inputs and outputs of the gearbox.

The packet processing block 365 provides, in some embodiments, an indication of the total delay directly to the receive delay predictor 381. Other embodiments may provide the receive delay predictor 381 with an indication of only the variable portion of the delay with the fixed portion having a pre-established value known by the receive delay predictor 381. In other embodiments, the receive delay predictor 381 may determine the delay introduced by the packet processing block 365 based on information it receives about the state of the packet processing block 365 and information about the packet.

The receive delay predictor 381 combines the delay information received from the synchronous processing block 361, the synchronous-to-packet adapter 363, and the packet processing block 365 to supply a predicted delay to the time calculator 369. The receive delay predictor 381 includes interaction between the processing blocks to determine the predicted delay. For example, a delay variation in the synchronous-to-packet adapter 363 may change a delay in the packet processing block 365. The receive delay predictor 381 may use a counter that indicates predicted timing of overhead signals in the synchronous protocol. The predicted timing of the overhead signals, along with predicted delays incurred after a start of packet was extracted by the deframer, allows the receive delay predictor 381 to determine whether the start of the packet was delayed due to the overhead signals and account for such delays. In some embodiments, the receive path block includes circuitry that operates using a gapped clock signal, for example, as may be used for some OTN framing. The receive delay predictor 381 according includes an adjustment in the predicted delay to account for gaps in the clock signal, for example, in an embodiment where gaps in the gapped clock signal occur cyclically, the receive delay predictor 381 may keep a history of when clock gaps have occurred to determine delays that a packet has encountered. The receive delay predictor 381 may convert the various delays to units of time and combine delays as described for the transmit delay predictor of FIG. 2.

The time calculator 369 receives the delay prediction from the receive delay predictor 381. The time calculator 369 combines the delay prediction and a time value from the local clock 385 to calculate a predicted reception time. The reception time is supplied from the time calculator 369 to the packet writer 367.

The local clock 385 supplies a local time base for the receive path device. The local clock 385 generally provides time values that are synchronized to another clock in the communication network. The local clock 385 may be shared with other devices, for example, a transmit path device. In some embodiments, the time value from local clock 385 is supplied to the receive delay predictor 381 where it is combined with the predicted receive delay to directly provide a predicted reception time to the time calculator 369.

Packets from the packet processing block 365 are received by the packet writer 367. The packets may contain a timing-related message, for example, a message according to the Precision Time Protocol (PTP) of IEEE Standard 1588. Depending on the particular message, the packet may include a field to be filled with or modified based on the time at which the packet was received. The packet writer 367, for packets with timing-related messages where a field is to be filled with the time of receipt, writes the reception time from the time calculator 369 into the packet. For other timing-related messages, the packet writer 367 may modify a timestamp value in the packet, for example, by subtracting the reception time from the timestamp value and writing the difference into the packet. The packet writer 367 may also set or update other fields in the packet, for example, a cyclic redundancy check field, based on the value written in the timing-related message. The modified packet is supplied to from the packet writer 367, for example, to a link layer device such as a media access controller. For packets without timing-related messages or with timing-related messages that are not processed by the packet writer 367, the packet writer 367 passes the packets without modification.

Figure 4:
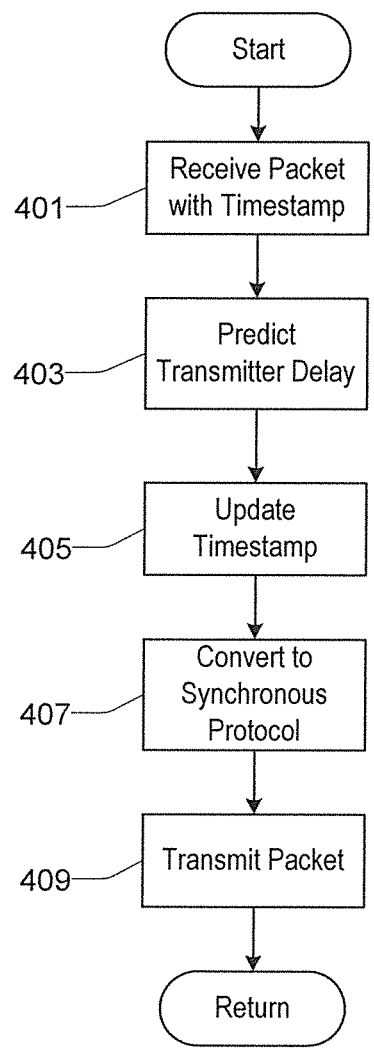
FIG. 4 is a flowchart of a process for handling timing information in accordance with aspects of the invention.

FIG. 4 is a flowchart of a process for handling timing information in accordance with aspects of the invention. The process may be implemented by a PHY device, for example, the device of FIG. 1. The process embodiment illustrated in FIG. 4 corresponds to processing performed by the transmit path block 110 of FIG. 1.

In block 401, the process receives a packet that includes a timestamp field in a timing-related message. For some packets, a value for the timestamp field may be supplied by the process. For other packets, the timestamp field may contain a value to be modified by the process. The processing applied to the timestamp filed may be determined from a classification of the packet.

In block 403, the process predicts a delay that will be incurred in transmitting the packet. Predicting the delay in transmitting the packet allows the time of transmission to be used in the value for the timestamp field before the packet is transmitted.

In block 405, the process updates the timestamp field in the packet. The process uses the delay predicted in block 403 in updating the timestamp field. The predicted delay may be added to a time value to create a predicted transmission time. The process may, for example, write the predicted transmission time in the timestamp field or add the predicted transmission time to a value in the timestamp field. In some embodiments, the process also writes a checksum-type value in the packet. For example, for an Ethernet packet, the process may update the frame check sequence to reflect the new timestamp value.

In block 407, the process converts the packet to a synchronous protocol. Converting the packet to the synchronous protocol may also include prior processing of the packet according to a packet protocol and subsequent processing according to the synchronous protocol.

In block 409, the process transmits the packet using the synchronous protocol. The process thereafter returns. Although the process was described as processing a packet in a sequence of blocks, the packet may be processed over the blocks in a pipelined manner.

Figure 5:
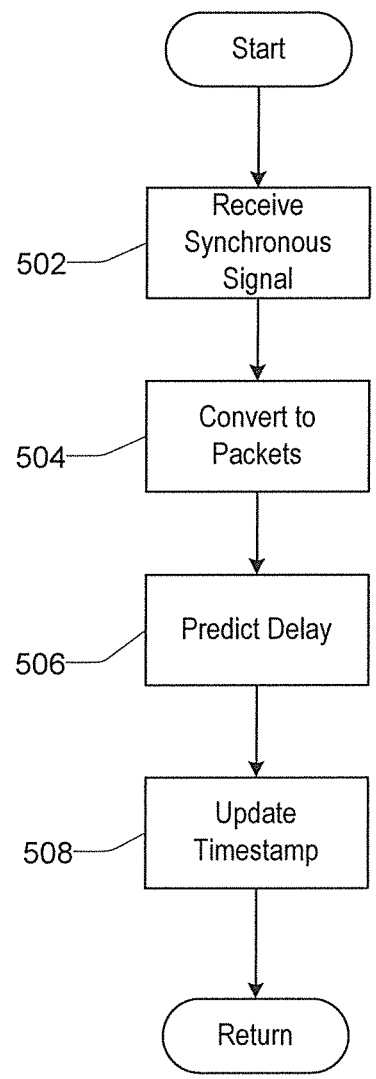
FIG. 5 is a flowchart of a process for handling timing information in accordance with aspects of the invention.

FIG. 5 is a flowchart of a process for handling timing information in accordance with aspects of the invention. The process may be implemented by a PHY device, for example, the device of FIG. 1. The process embodiment illustrated in FIG. 5 corresponds to processing performed by the receive path block 160 of FIG. 1.

In block 502, the process receives a signal from a communication link. The signal contains data formatted according to a synchronous protocol. The signal may be received, for example, from a fiber optic cable.

In block 504, the process converts the received signal to a packet of data. The packet of data may be extracted from the received signal according to a standardized protocol that was used by a transmitter to generate the received signal. Additionally, the received signal may receive processing according to the synchronous protocol before the packet is extracted, and the packet may receive further processing according to the packet protocol.

In block 506, the process predicts the delay of the packet of data through the prior processing blocks. Since the time that a packet was received, as used in subsequent blocks of the process, is defined as when a specific portion of the packet leaves the physical medium of the communication link, the process predicts the delay so that the time can be accurately determined after being delayed by the preceding processing.

In block 508, the process updates a timestamp field in the data packet. The process uses the delay predicted in block 506 in updating the timestamp field. The process may update the timestamp field in a manner determined from a classification of the packet. For one classification, the process writes the timestamp field with a predicted time of receipt formed by adding the predicted delay to a time value. For another classification, the process subtracts the predicted reception time from a value in the timestamp field. In some embodiments, the process also writes a checksum-type value in the packet. For example, for an Ethernet format packet, the process may update the frame check sequence to reflect the new timestamp value. The packet with the updated timestamp field is supplied by the process to, for example, a link layer device. Although the process was described as processing a packet in a sequence of blocks, the packet may be processed over the blocks in a pipelined manner.

Figure 6:
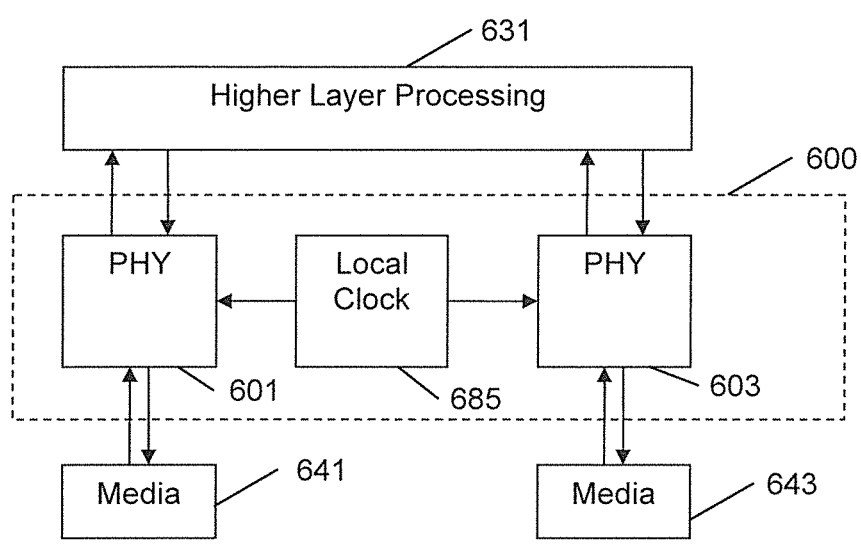
FIG. 6 is a block diagram of a communication network node in accordance with aspects of the invention.

FIG. 6 is a block diagram of a communication network node in accordance with aspects of the invention. The node includes a first PHY 601 and a second PHY 603 that transmit and receive signals from a first physical media link 641 and a second physical media link 643, respectively. The signals in the physical media links 641, 643 are formatted according to a synchronous protocol. Each PHY is additionally coupled to a higher-layer processing block 631. The PHYs communicate with the high-layer processing block using a packet protocol. The node includes a local clock 685 that supplies local time values to the PHYs. Each PHY includes a transmit block and receive block, for example, as described with reference to FIGS. 2 and 3. The node may be provided as an integrated circuit. The PHYs handle timestamp processing and may be used to add clock synchronization to a network without substantial modification of other components.

Although the invention has been discussed with respect to various embodiments, it should be recognized that the invention comprises the novel and non-obvious claims supported by this disclosure.

What is claimed is:

1. A transmission device, comprising:
   first circuitry configured to update timestamp fields contained in timing-related messages contained in at least some packets received by the first circuitry utilizing at least predicted delays, wherein updating the timestamp field comprises determining the predicted delay and writing information regarding the predicted delay into the timestamp field;
   second circuitry configured to process the packet according to a packet protocol and adapt the at least some packets, received from said first circuitry and comprising said updated timestamp fields, from the packet protocol to a synchronous protocol, the second circuitry coupled to the first circuitry, the second circuitry further configured to transmit a signal formatted according to the synchronous protocol containing the at least some packets, the second circuitry comprising a buffer configured to match data rates between the packet protocol and the synchronous protocol; and
   third circuitry configured to predict the delays that will be incurred by the at least some packets in the second circuitry, based on delay related information from the second circuitry, said delay related information responsive to the present state of the second circuitry, the present state of the second circuitry comprising a status of the second circuitry buffer, and supply the predicted delays to the first circuitry configured to update timestamp fields,
   wherein said delay prediction comprises determining a delay that will be incurred in processing the packet according to the packet protocol and determining a delay that will be incurred in adapting the packet for transmission using the synchronous protocol.

2. The transmission device of claim 1, wherein the present state of the second circuitry further comprises timings of the at least some packets in relation to timings of overhead sections in the signal formatted according to the synchronous protocol.

3. A method of processing a timing-related message, the method comprising:
   receiving a packet containing the timing-related message, the packet formatted according to a packet protocol;
   predicting a delay to be incurred in a transmit processing block arranged to adapt the packet for transmission using a synchronous protocol and in transmitting the packet, said delay prediction responsive to the present state of the transmit processing block;
   updating a timestamp field in the timing-related message in the packet based on the predicted delay, wherein updating the timestamp field comprises determining the predicted delay and writing information regarding the predicted delay into the timestamp field;

after updating the timestamp field based on the predicted delay, processing the packet according to the packet protocol and adapting the packet containing the updated timestamp field for transmission using a synchronous protocol, said adapting performed by the transmit processing block, wherein the present state of the transmit processing block comprises a status of a buffer used for matching data rates between the packet protocol and the synchronous protocol; and transmitting, via the transmit processing block, the adapted packet using the synchronous protocol, wherein said delay prediction responsive to the present state of the transmit processing block further comprises determining a delay that will be incurred in processing the packet according to the packet protocol and determining a delay that will be incurred in adapting the packet for transmission using the synchronous protocol.

4. The method of claim 3, the present state of the transmit processing block further comprises a state of adapting the packet for transmission using the synchronous protocol.

5. The method of claim 4, wherein the state of adapting the packet comprises a timing of the packet in relation to a timing of an overhead section in the synchronous protocol.

6. The method of claim 3, wherein receiving the packet comprises receiving the packet on a parallel bus, and wherein the present state of the transmit processing block further comprises a location of a portion of the packet on the parallel bus.

7. The method of claim 3, wherein updating the timestamp field comprises calculating a predicted transmission time using the predicted delay and adding the predicted transmission time to a value in the timestamp field.

8. The method of claim 3, further comprising receiving a time value, and wherein said writing information regarding the predicted delay comprises adding the time value and the predicted delay and writing said added value into the timestamp field.

* * * * *